United States Patent [19]
Puretic

[11] 3,775,890
[45] Dec. 4, 1973

[54] FISH IMPELLER

[76] Inventor: Mario J. Puretic, 259 6th Ave. N., Tierra Verde, Fla.

[22] Filed: Feb. 23, 1972

[21] Appl. No.: 228,515

Related U.S. Application Data

[63] Continuation-in-part of Ser. No. 74,598, Sept. 23, 1970, abandoned, which is a continuation-in-part of Ser. No. 51,160, June 30, 1970, abandoned.

[52] U.S. Cl. ................................................ 43/6.5
[51] Int. Cl. ............................................ A01k 79/00
[58] Field of Search ....................................... 43/6.5

[56] References Cited
UNITED STATES PATENTS

| | | | |
|---|---|---|---|
| 3,124,890 | 3/1964 | Puretic................................ | 43/6.5 |
| 1,486,485 | 3/1924 | Frissell................................ | 43/6.5 |

*Primary Examiner*—Louis G. Mancene
*Assistant Examiner*—Daniel J. Leach
*Attorney*—Francis A. Utecht et al.

[57] ABSTRACT

Fish handling apparatus for lifting fish may be used, for example, to transfer fish from a net alongside a fishing boat onto a fishing boat. The apparatus includes an enclosure arranged in a loop and having a fish discharge aperture formed in its upper portion. When fish are to be removed from the net, the lower portion of the enclosure is positioned within the net. Power-driven chains are looped about the interior of the enclosure. A plurality of baskets are attached to the chains for propelling fish upwardly from the lower portion of the enclosure upwardly through the fish discharge aperture onto the deck of the fishing boat. A unique basket construction permits the water to be readily drained as the fish are moved upwardly. A modification employs a curved enclosure that affords a smooth, unbuckled and extremely rigid construction. A further modification of the apparatus employs an enclosure having a laterally offset upper portion for improved discharge of fish. Means for manipulating the enclosure between its stowed and operating positions aboard the fishing boat are provided.

13 Claims, 14 Drawing Figures

PATENTED DEC 4 1973

INVENTOR.
MARIO J. PURETIC
BY Fulwider, Patton, Rieber,
Lee and Utecht
ATTORNEYS

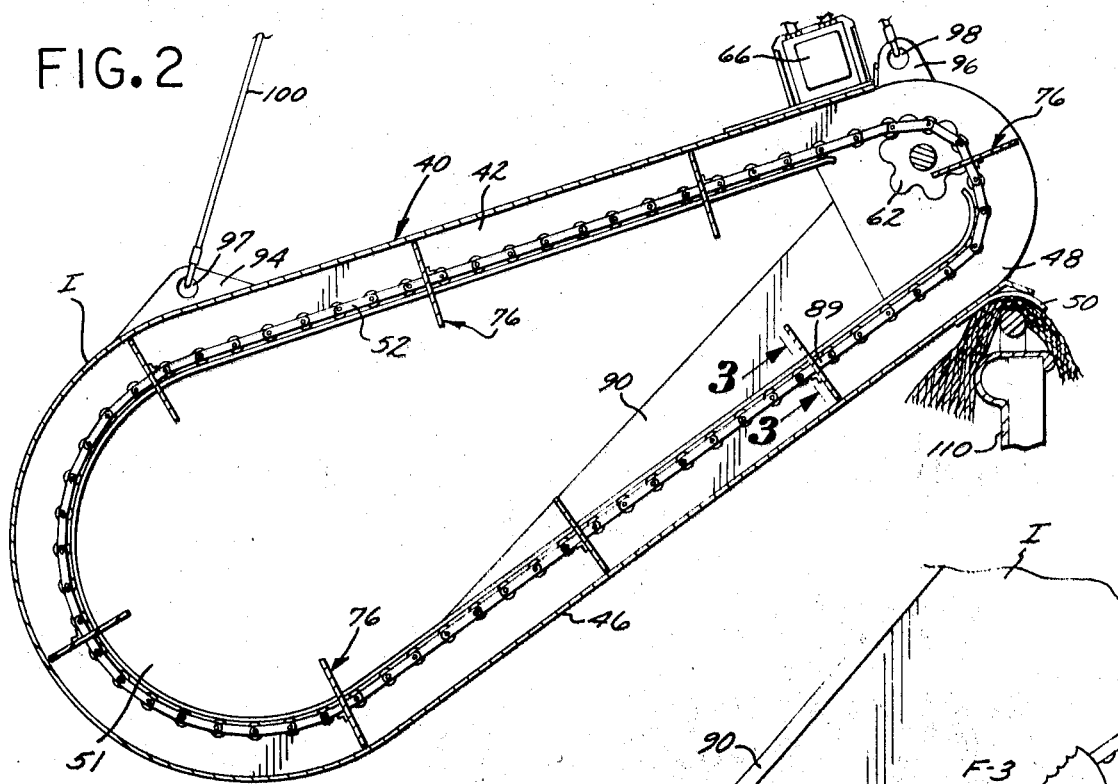
FIG. 2
FIG. 3
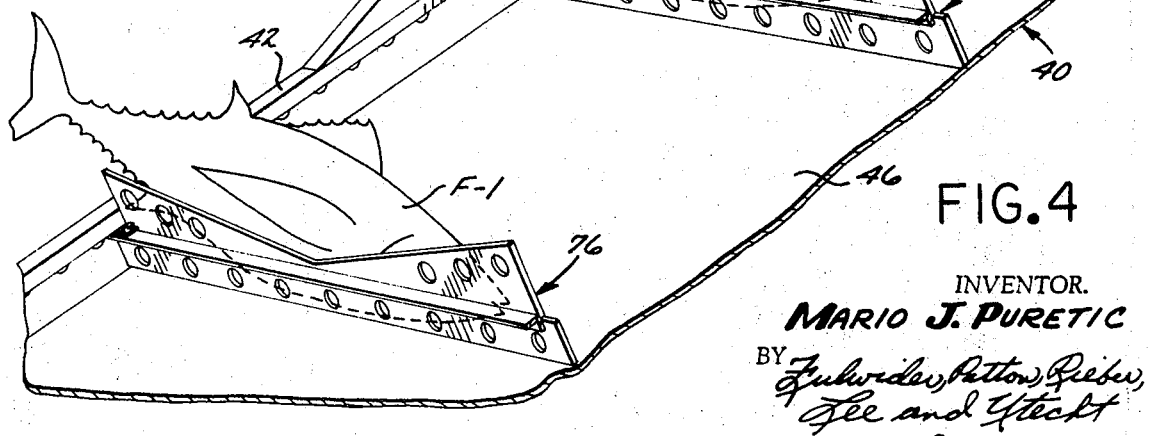
FIG. 4
INVENTOR.
MARIO J. PURETIC

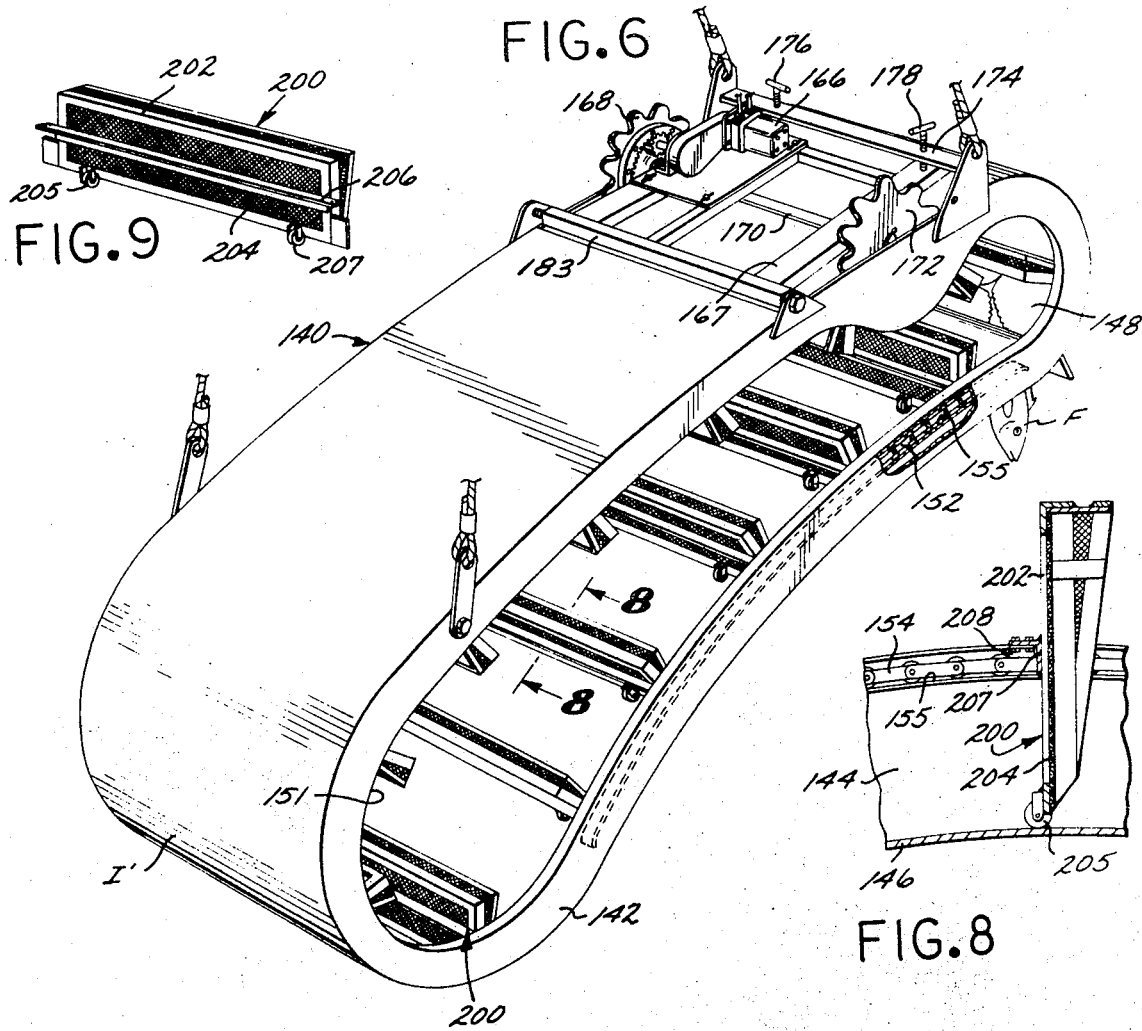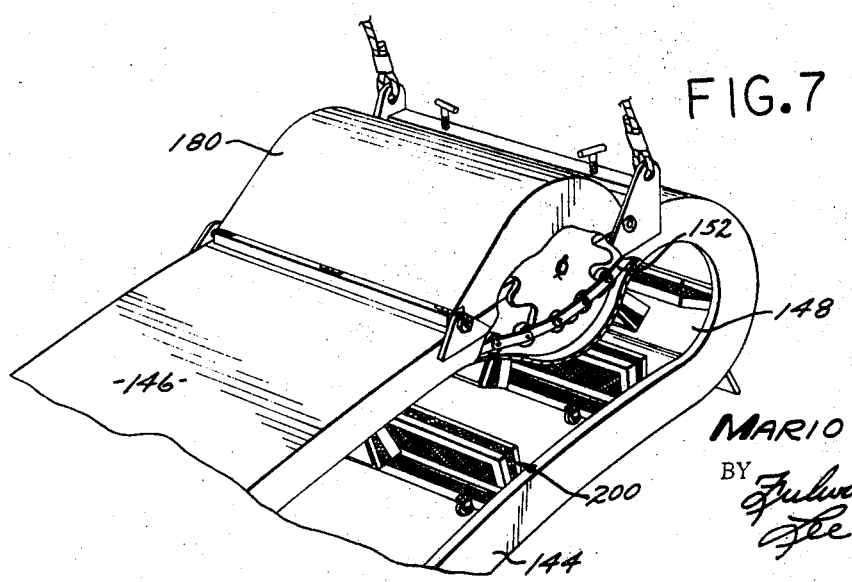

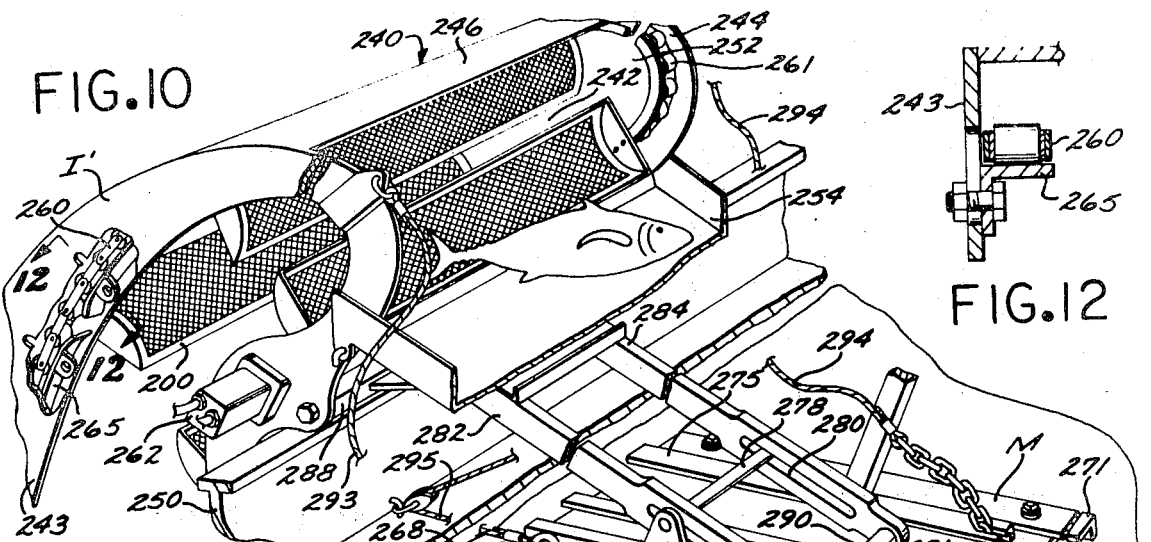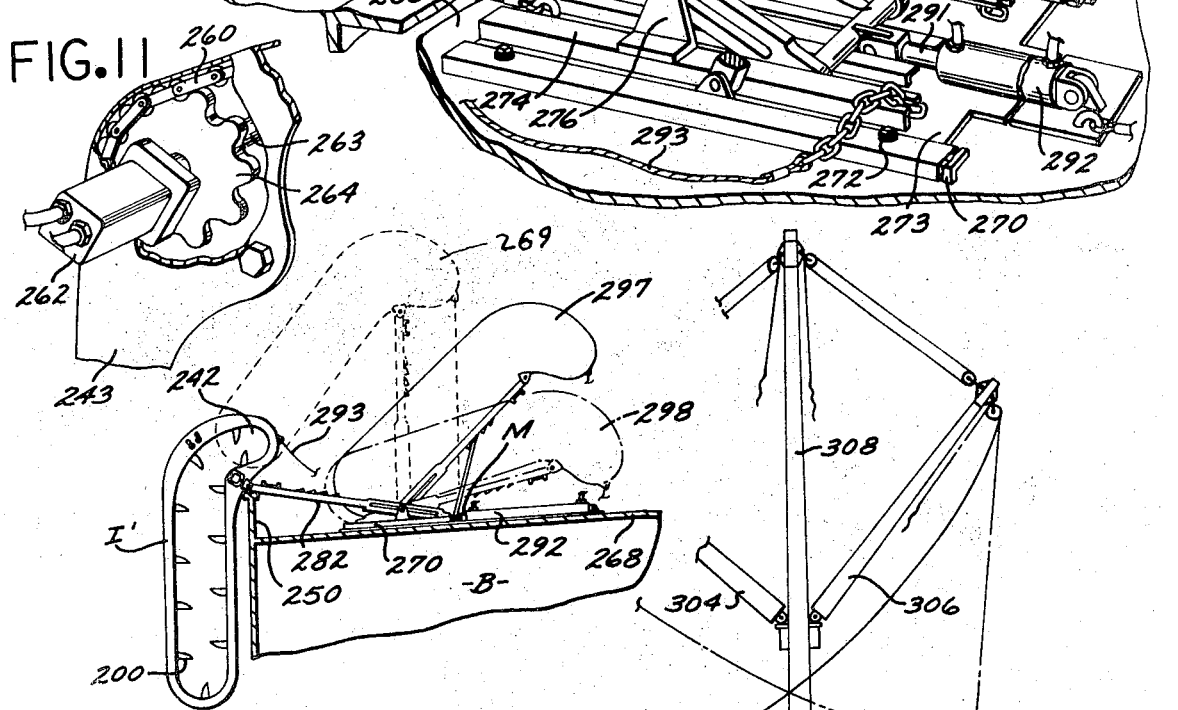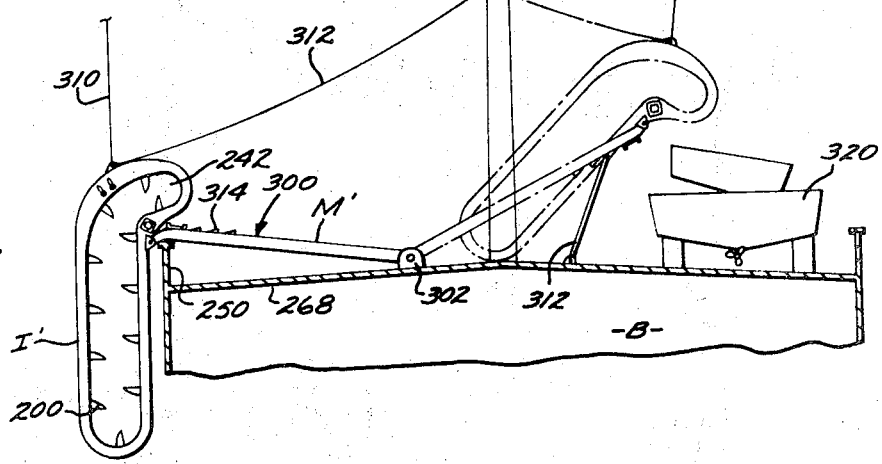

FISH IMPELLER

CROSS REFERENCE TO OTHER APPLICATION

This application is a continuation-in-part of my application Ser. No. 74,598 filed Sept. 23, 1970 which was a continuation-in-part of Ser. No. 51,160 filed June 30, 1970, both abandoned.

BACKGROUND OF THE INVENTION

1. Field of the Invention

The present invention relates generally to the art of fishing and more particularly to a novel arrangement for recovering fish from a net and transferring such fish onto a fishing boat, as well as to a unique fish handling apparatus.

2. Description of the Prior Art:

Although fishing is one of the oldest arts, comparatively little has been done over the years to change apparatus and methods that have been utilized in the fishing art for centuries. A fundamental and novel advance in the art of fishing is disclosed in my U.S. Pat. Nos. 2,733,530 and 2,733,531, issued Feb. 7, 1956. These patents relate to an apparatus and method for drawing a net alongside a fishing boat by means of a power-driven block suspended from a boom on the boat. The use of such power-driven block has greatly expedited the hauling-in of the net alongside the boat, and it has been possible in many cases to substantially reduce the number of men required for a commercial fishing boat crew. Although the use of such power-driven block permits the netted fish to be brought alongside the fishing boat in a minimum period of time, there still remains the difficult problem of recovering the fish from the net and transferring such fish into the hold of the fishing boat.

It is conventional to scoop the netted fish from the net by means of a shallow, basket-like device, generally termed a brailer. This brailer generally comprises a rigid hoop approximately 5 or 6 feet in diameter from which depends an open-topped bag-like net. The hoop is attached to a long handle. This handle is manipulated by two or three men positioned in a large skiff alongside the fishing boat. These men manually urge the hoop into the mass of heavy fish within the seine. Thereafter, the hoop is hoisted towards the fishing boat by means of a line attached thereto and extending to the fishing boat's deck. During this operation the skiff is usually pitching heavily in the sea. Thus, the brailing operation is a dangerous job requiring great experience and tremendous strength. Moreover, this operation is time consuming. Alternatively, the netted fish may be pumped into a fishing boat. This system, however, is only usable with smaller fish, and the fish are generally unfit for human consumption.

SUMMARY OF THE INVENTION

Applicant is the inventor of U.S. Pat. No. 3,124,890 issued Mar. 17, 1964 directed to conveyor apparatus for removing fish from a net and loading such fish onto a fishing boat. Although the conveyor apparatus shown in my aforedescribed U.S. Pat. No. 3,124,890 affords improved results over the conventional scooping of fish from a net onto a fishing boat, the conveyor belt shown in such patent can occasionally damage the fish. The fish handling apparatus of the present invention eliminates any danger of fish damage. Additionally, the fish handling apparatus of the present invention is more efficient and fool-proof in use than my prior conveyor apparatus. Another important advantage of the fish handling apparatus of the present invention is that it is economical of manufacture, compact, lightweight and need not be secured to the net. An important advantage of a modified form of fish impeller apparatus of the present invention is the use of a curved enclosure of extremely rigid construction. A modified form of basket construction affords maximum water drainage as the fish are impelled upwardly out of the water onto the fishing boat. A further modification of my fish handling apparatus affords most efficient discharge of the fish. I have also provided a unique manipulation mechanism for moving the apparatus between a stowed and an operating position aboard the fishing boat.

BRIEF DESCRIPTION OF THE DRAWINGS

FIG. 2 is a vertical sectional view taken in enlarged scale along line 2—2 of FIG. 1;

FIG. 3 is a sectional view taken in further enlarged scale along line 3—3 of FIG. 2;

FIG. 4 is a broken perspective view showing the operation of a guide member utilized with said apparatus;

FIG. 6 is a perspective view showing a modified form of fish handling apparatus embodying the present invention, with the power unit cover thereof removed in the interest of clarity;

FIG. 7 is a broken perspective view similar to FIG. 6, but showing said cover in place;

FIG. 8 is a sectional view taken along line 8—8 of FIG. 6;

FIG. 9 is a perspective view of a modified form of basket;

FIG. 10 is a broken perspective view of a second modified fish handling apparatus;

FIG. 11 is a broken, perspective view of a detail of the second apparatus;

FIG. 12 is a sectional view along line 12—12 of FIG. 10;

FIG. 13 is a reduced side view showing the operation of the manipulating mechanism of FIG. 10; and FIG. 14 is a reduced side view of a second form of manipulating mechanism.

DESCRIPTION OF THE PREFERRED EMBODIMENT

Figure 1:
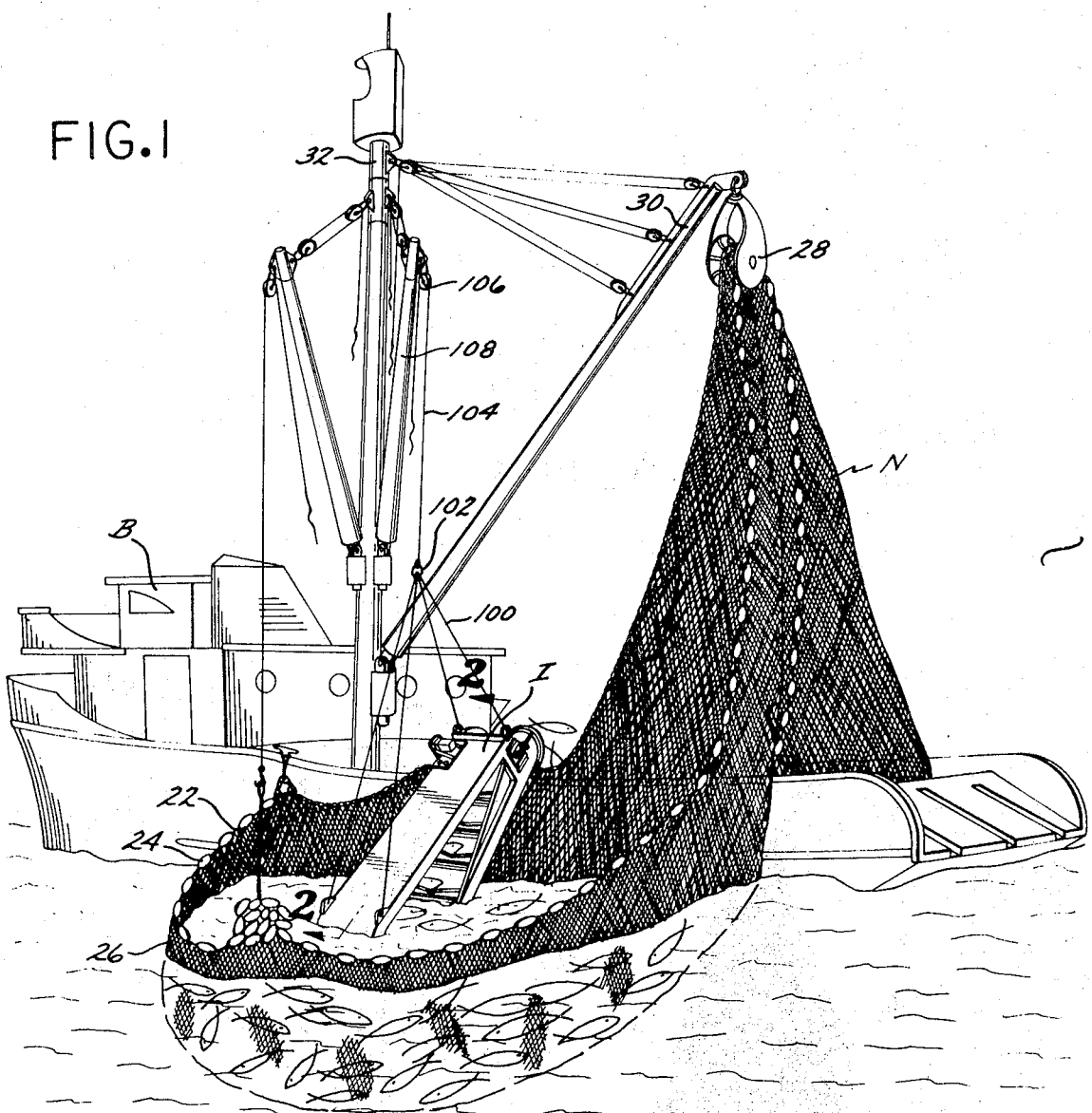
FIG. 1 is a perspective view showing a fishing boat equipped with a preferred form of fish handling apparatus embodying the present invention.

Referring to the drawings, there is shown a fishing boat B equipped with a preferred form of fish handling apparatus I embodying the present invention, such apparatus being shown disposed along one side of the fishing boat B. The fishing boat B is provided with a conventional net N, commonly termed a seine net. Net N includes a float or cork linke 22, which as its name implies has a number of corks, floats or other buoyant bodies 24 attached thereto at longitudinally spaced intervals. An elongated wall or panel of webbing 26 is supported from the cork line 22. The lower edge portions of the webbing panel 26 are attached to a purse line that is adapted to have its length reduced in a well-known manner so as to "purse" the lower portion of the webbing panel together about a school of fish.

In FIG. 1, the net N and its associated parts are shown after the main portion of the net N has been taken aboard boat B with the remaining portion of the net and the fish contained therein being gathered alongside the boat B. The net N is pulled onto the boat B by means of a power-driven block 28. This power block 28 is of the type disclosed in my U.S. Pat. No. 2,733,531. This type of power block has become conventional equipment on many fishing boats and is used to rapidly retrieve a seine net and deposit it upon the deck of a fishing boat. The details of the power block 28 are not within the scope of the present invention and hence such details are not set forth herein. The power block 28 is seen to be supported on a boom 30 carried by the mast 32 of the fishing boat B.

A preferred form of fish handling apparatus I embodying the present invention includes an open-sided enclosure generally designated 40 that defines an elongated generally tear drop-shaped loop. The enclosure 40 may be formed of a suitable material such as metal, wood, synthetic plastic or a combination of these materials. Enclosure 40 includes a pair of side frame elements 42 and 44 which are horizontally aligned. These side frame elements are provided with a cover 46. The upper portion of the cover 46 is open so as to define a fish-discharge aperture 48. Cover 46 is bent at the lower edge of aperture 48 to provide a retainer lip 50. The lower portion of the enclosure defines a fish intake 51.

Figure 5:
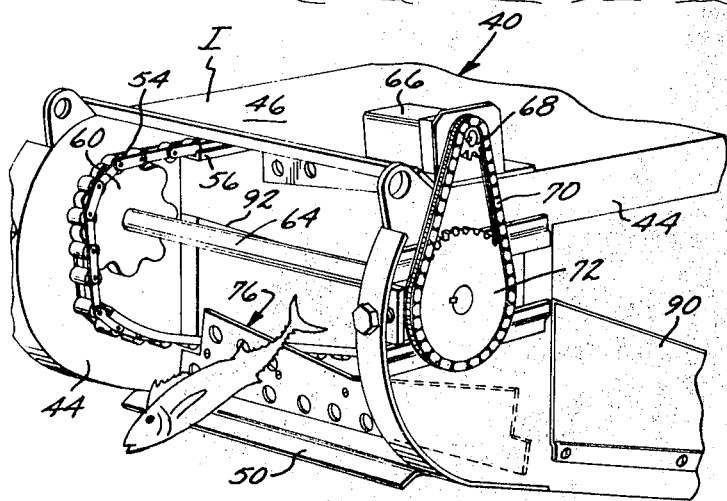
FIG. 5 is a broken perspective view showing a drive means utilized with said apparatus.

A pair of like rollers chains 52 and 54 are looped about the interior of the enclosure 40. As indicated particularly in FIGS. 3 and 4, these chains are supported within generally U-shaped guides 56 formed on the side frames 42 and 44. As shown in FIG. 5, the upper portion of the side frames 42 annd 44 rotatably support a pair of sprockets 60 and 62 by means of a horizontal shaft 64, the sprockets being keyed to the shaft. The teeth of the sprockets 60 and 62 are engaged with the links of the two chains 52 and 54. The sprockets 60 and 62 are preferably driven by means of a hydraulic motor 66 of conventional construction mounted on the upper rear portion of enclosure 40. Alternatively, an electric motor may be employed. The drive shaft of the motor 66 is keyed to a pinion 68. The pinion 68 is in engagement with the links of a short drive chain 70. The links of drive chain 70 are also engaged with the teeth of a gear 72 keyed to one end of the shaft 64 outwardly of side frame 44.

A plurality of like, elongated baskets, generally designated 76, are attached to the chains 52 and 54 at spaced portions therealong. Referring particularly to FIG. 3, each basket 76 includes an upper element 78 and a lower element 80. Each upper basket element 78 is provided with a stiffening angle 82 affixed to its respective upper basket element as by welding. The upper basket elements 78 are secured to the lower basket elements by means of a plurality of bolt and nut combinations 84 extending through the vertical web of angle 82. The outer edges of each stiffening angle 82 are secured to a generally L-shaped clip 86 by means of bolt and nut combination 88. The free leg of each clip 86 is affixed to an inner inwardly-facing link of chains 52 and 54, as indicated particularly at 89 in FIG. 2. The upper portion of each upper basket element 78 extends inwardly and downwardly in a generally V-shaped configuration. The lower element 80 of each basket 76 extends outwardly below the chains 52 and 54, as shown in FIGS. 3 and 5. The lower edge of each lower basket element 80 rides just above the inwardly-facing surface of cover 46. The baskets may be formed with apertures 81 for water drainage.

The side frames 42 and 44 are provided with a pair of like, aligned fish guides 90 of generally triangular configuration. As indicated in FIG. 2, the upper edges of guides 90 extend upwardly and rearwardly relative to the lower run of the side frame elements 42 and 44.

The upper portion of the side frames 42 and 44 are provided with a pair of aligned upper and lower support ears 92 and 94. These support ears are formed with bores 97 and 98, respectively. The bores 97 and 98 receive the four legs of a cable bridle 100. As indicated particularly in FIG. 1, the mid-portion of the cable bridle 100 receives the lifting ring 102 of a hoisting cable 104 which runs over a pulley 106 carried upon the free end of an auxiliary boom 108 having its lower end pivotally connected to the lower portion of the mast 32 of the fishing boat B.

In the operation of the aforedescribed parts the fish handling apparatus I is positioned alongside the fishing boat B by means of a cable bridle 100 and the support elements attached thereto. The fish intake 51 is deposited within the confines of net N and below the water. The retainer lip 50 may conveniently rest upon the rail 110 of the fishing boat, as shown particularly in FIG. 2. The motor 66 will then be operated so as to effect movement of the chains 52 and 54. As indicated in FIG. 2, the lower run of the chains will move upwardly and rearwardly so as to effect concurrent movement of the baskets 76. Baskets 76 will propel fish upwardly from the lower portion of the enclosure 40 through the fish discharge aperture 48 whereby fish will be rapidly and continuously removed from within the confines of the net N. In this manner the confined fish will be gradually removed from within the confines of the net N and deposited on the deck of the fishing boat B. These fish may be directed through a hopper arranged on the deck of the boat B into one or more holds. As the fish are removed from the confines of the net N, the weight of the net will pull the sides thereof together so as to continually cause fish to be urged through the fish intake 51. The net may be progressively raised to facilitate this fish removing process. It should be particularly noted that the removal of the fish from the net and the transfer thereof onto the fishing boat will not damage the fish in any way. The movement provided by the impeller baskets is smooth and gentle so that the fish will not be bruised.

Referring now to FIG. 4, there is shown an arrangement for guiding the fish F towards the center of the baskets 76 of the fish handling apparatus I as the fish are being moved upwardly along the bottom wall of the enclosure 40. Thus, it will be noted with the fish F disposed at its lowermost position F-1 its tail portion extends outwardly over the side of the side frame 42. When the tail portion of the fish engages the upper edge of the guide 90 it will be gradually forced upwardly because the upper edge of the guide 90 rises at a greater angle than the upper edge of the side frame 42, as indicated at F-2. As the tail portion of the fish is thus raised gravity will cause the the fish to slide downwardly and towards the interior of the enclosure. In this manner the fish will gradually be forced away from the side frame 42 until all or the majority of its tail portion is positioned within the confines of the enclosure, as indicated at F–3.

Referring now to FIGS. 6–9, there is shown a modified form of fish handling apparatus I' embodying the present invention. This modified form is generally similar to the form of the invention shown in FIGS. 1–5. Thus, there is disclosed an open-sided enclosure, generally designated 140 that defines an elongated loop wherein the upper and lower reaches of such loop are curved upwardly rather than being generally straight-sided as in the case of the previously described apparatus I. Enclosure 140 includes a pair of like, side frame elements 142 and 144 which are horizontally aligned and are provided with a cover 146.

It should be particularly noted that because of the upwardly curved configuration of the side frames 142 and 144 where the cover is formed of metal, such metal will be restrained against buckling. Accordingly, an extremely rigid construction results. Also, it is possible to better control the direction of the fish being moved by the apparatus I. As will be clear by reference to FIG. 6, the upper portion of the cover is open so as to define a fish-discharge aperture 148, with a fish F being shown dropping through such aperture. The opposite sides of the lower portion of the enclosure 140 define a fish intake 151.

As with the fish handling apparatus I shown in FIGS. 1–8, there are provided a pair of like roller chains 152 and 154 which are looped about the interior of the enclosure 140. It is desirable to provide the lower reaches of the side frames 142 and 144 with an inner chain rail 155 to cause the lower reaches of the chains 152 and 154 to follow the contour of the side frames 142 and 144.

As shown particularly in FIG. 6, a drive motor 166 is mounted on a bed 167 that is pivotally connected at its lower end to the side frames 142 and 144. The motor 166 drives a first driving sprocket 168 through suitable gearing. The drive sprocket 168 is keyed to a horizontal shaft 170 with a second drive sprocket 172 being keyed to the opposite end of such shaft. Shaft 170 is carried by bed 167. As indicated in FIG. 7, the chains 152 and 154 are engaged with the teeth of the drive sprockets 168 and 172. A rigid cross-bar 174 extends horizontally across the upper portion of the two side frames 142 and 144. A pair of threaded posts 176 and 178 are threadably carried by the cross-bar 174. Rotation of these posts serves to control the tension of the two chains 152 and 154 by moving the bed 167 upwardly or downwardly relative to the chains. A cover 180 is provided for the aforedescribed drive unit, with the lower end of such cover being secured to a horizontal pivot shaft 183 that extends between the side frames 142 and 146. Positioning of the power unit as indicated in FIGS. 6 and 7 affords an obstruction-free path for the fish as they are moved upwardly out of the water and through the fish discharge aperture 148.

A plurality of like elongated baskets, generally designated 200, are attached to the chains 152 and 154 at spaced portions therealong. Referring particularly to FIGS. 8 and 9, each basket 200 includes a rigid generally V-shaped framework 202 covered by steel mesh 204. The lower portion of the frameworks 202 are provided with a pair of rollers 205 and 206 which roll along the interior of the enclosure cover 146 with minimum friction. The midportion of each framework 204 is provided with an elongated bracket 207 that is rigidly secured to a clip 208. Each such clip 208 is affixed to aligned links of the chains 152 and 154. The construction of the baskets 200 provides maximum water drainage with least turbulence as the fish are moved upwardly out of the water. Also, the connection of the baskets to the chains 152 and 154 at the intermediate portion of the baskets results in the weight of the fish being balanced along the face of the baskets. It will be clear that the baskets can move the fish upwardly through the enclosure 140 without damaging the fish nor endangering any workman located adjacent the apparatus I'.

Referring now to FIGS. 10, 11 and 12 there is shown a second modified fish handling apparatus I' and a mainipulating mechanism M therefor. This modified form of apparatus I' is generally similar to the apparatus I' shown in FIGS. 6–9. Thus, there is disclosed an open-sided enclosure, generally designated 240, that defines an elongated loop having a generally vertically extending main body 241 that merges into a laterally offset upper portion 242 that extends inboard relative to boat B. Enclosure 240 includes a pair of like side frame elements 243 and 244 which are horizontally aligned and which are provided with a cover 246. It should be particularly noted that the lateral offset 242 of enclosure 240 overhangs the rail 250 of the fishing boat. The cover 246 is formed with a fish discharge aperture 252 that extends from the intermediate part of the offset 242 to the upper portion thereof and facing inboard relative to boat B. This arrangement facilitates directing fish from the fish discharge aperture 252 onto a chute 254, as shown in FIG. 10.

With particular reference to FIGS. 10 and 11, the enclosure 240 houses a pair of like roller chains 260 and 261 which are looped about the interior of such enclosure. A hydraulic drive motor 262 secured to the upper portion of side frame 243 rotates a shaft 263 that is keyed to left and right sprockets 264 that are engaged with the two chains 260 and 261. It should be noted that tension of the chains 260 and 261 may be adjusted by means of a chain rail 265 adjustably secured to the side frames 243 and 242 for movement towards and away from the inner surfaces of the chains. Chain rails 265 and adjustment means for side frame 244 are not visible in FIG. 10, however, it is a mirror image of the arrangement shown in side frame 243. Thus, as shown in FIG. 12, chain rails 265 are connected to their respective frame elements by bolt and nut combinations 266 slidably disposed in a slot 267 formed in the upper portion of the side rails opposite motor 262. It is a particular advantage of the positioning motor 262 at the juncture between the lateral discharge offset 242 and the upper end of main body 241 is that it affords minimum friction and wear on the chains 260 and 261. In this regard, the only heavy loads imposed upon such chains occur as they raise the fish-carrying baskets 200' up the side of enclosure 240 immediately adjacent boat B. By the time the chains start curving around the interior of lateral offset 242 the fish will have been discharged from baskets 200' and accordingly minimum strain will be imposed upon the chains as they follow the curve around the interior of such offset. This arrangement therefor reduces the effort needed to drive the chains 260 and 261, and accordingly the size of drive motor 262. Note that baskets 200' in this form of fish handling apparatus are curved.

In FIG. 13 the fish handling apparatus I' is shown being moved between its operating position and its stowed position on the deck 268 of the fishing boat B by means of the manipulating mechanism M. The operating position of the apparatus I' is shown in solid outline in FIG. 11, from which point the apparatus is first raised and then lowered until it is disposed over the deck 268. The manipulating mechanism M includes a base comprising a pair of generally L-shaped rails 270 and 272 fixed upon the deck 268. A plate 273 extends between rails 270 and 271 and a pair of channel elements 274 and 275 are secured thereupon. Plate 273 is slidable relative to rails 270 and 271 and its athwartship position can be set by stop bolts 272. A pair of aligned ears 276 are fixed upon the channel elements. A bar 278 extends between ears 276. This bar 278 is slidably disposed within a pair of aligned slots 280 formed in the lower front portion of a pair of support arms 282 and 284. The upper end of arms 282 and 284 are pivotly secured to a cross-rod 288 which is in turn affixed to the underside of the lateral offset 242 of the enclosure 240. The lower portion of the arms 282 and 284 are rigidly interconnected by a push sleeve 290 that is journaled upon a pin (not shown) that extends between the lower end of arms 282 and 284. The mid-portion of the sleeve 290 is pivotly connected to the free end of plunger 291 that extends from a hydraulic cylinder 292. The opposite end of the hydraulic cylinder 292 is pivotly connected to the front end of the plate 273. A pair of snubbing cables 293 and 294 extend from the mid-portion of the enclosure offset 242, to the front of the channel elements 274 and 275. A positioning cable 295 is provided to adjust the athwartship location of plate 273.

In the operation of the manipulating mechanism M, the fish handling apparatus I' is disposed in its generally vertically extending position of FIG. 13 when fish are to be removed from a net (not shown) alongside the fishing boat B. At this time the parts of the manipulating mechanism M will be arranged in their position of FIG. 10. When the fish handling apparatus I' is to be moved into its stowed position of FIG. 13 the hydraulic cylinder 292 is actuated so as to cause the plunger 291 through push-pin 290 to urge the support arms 282 and 284 outboard relative to the base rails 270 and 272. Concurrent with the outboard movement of the lower ends of the support arms the upper ends thereof will be caused to swing in a clockwise direction. In this manner, the arms will raise the enclosure 240 to its phantom outline position indicated at 297 in FIG. 13. In this position, the arms 282 and 284 are disposed generally vertically. It will be noted that the snubbing cables 293 and 294 serve to prevent the apparatus I' from pivoting counter-clockwise as the support arms pivot clockwise whereby the lower end of the enclosure 240 will clear rail 250. When the plunger 291 has undergone full extension, the fish handling apparatus I' will then be arranged in its compact, stowed position on the deck of the fishing boat B. To again move the apparatus to its operation position, the plunger 291 will be retracted within its cylinder 192.

Preferably, as indicated in FIG. 13, the support arms 282 and 284 will be provided with a plurality of stops 295 which can be selectively engaged with the free end of a positioning frame 296 pivotally mounted on deck 268. The positioning frame 296 will serve to maintain the support arms 282 and 284 thus the fish handling apparatus I' at a desired position 297 relative to the deck to thereby provide working or stowage space below the enclosure 240. Alternatively, however, the enclosure 240 may be stowed closer to deck to 268, as indicated at 298.

Referring now to FIG. 14, there is shown a second, more economical, form of manipulating mechanism M' for the apparatus I'. This form of manipulating mechanism M' includes a pair of aligned support arms defining an A-frame 300. The lower end of A-frame 300 is pivotally secured to a support base 302 affixed upon the deck 268 of the fishing boat B. The upper end of A-frame 300 is pivotally affixed to the underside of the lateral offset 242 of the enclosure 240. Enclosure 240 is moved from its operating position shown in solid outline in FIG. 14 to its stowed position shown phantom outline in that figure by means of a pair of ship's booms 304 and 306 secured to the mast 308 of fishing boat B through hoisting cables 310 and 312, respectively, carried by such booms. Hoisting cable 310 is operated to raise the enclosure 240 upwardly clear of the rail 250. Thereafter, the other hoisting cable 312 is operated, with the first hoisting cable 310 being let-off, so as to cause the enclosure 240 to be lifted upwardly and inboard, with the A-frame 300 concurrently undergoing clockwise movement between its positions shown in FIG. 14. Preferably, the arms of A-frame 300 will be provided with a plurality of stops 314 which will be selectively engaged with the free end of a positioning rod 316 mounted on deck 268. The positioning rod 312 will serve to maintain the A-frame 300 and thus the enclosure 240 at a desired position relative to the deck to thereby ride clear of the skiffs 320 stowed on the deck of the fishing boat B.

It will be apparent that both forms of manipulating mechanisms M and M' permit the fish handling apparatus I' to be moved safely even during rough weather and with minimum skill by the crew. It will also be apparent that the manipulating mechanisms may be utilized with the fish handling apparatus shown in FIGS. 1–9.

Various modifications and changes may be made with respect to the foregoing detailed description without departing from the spirit of the present invention.

I claim:

1. Fish handling apparatus for transferring fish from a net to a fishing boat, comprising:
   - an open-sided enclosure that defines a loop, said enclosure being formed with a fish-discharge aperture in its upper portion, and with the lower portion of said enclosure defining a fish intake through said open sides;
   - support means on said fishing boat for holding said enclosure adjacent said fishing boat with its lower portion disposed within said net to receive fish to be transferred and with its upper portion abutting said boat;
   - chain means looped about the interior of said enclosure;
   - a plurality of baskets attached to said chain means at spaced portions therealong; and
   - power-operated means that drive said chain means to thereby continuously propel fish entering said fish intake from said net upwardly along the bottom of said enclosure and through said fish-discharge aperture onto said fishing boat.

2. Fish handling apparatus as set forth in claim 1 wherein the sides of said enclosure are provided with upwardly and inwardly extending fish guide means that engage fish projecting beyond the sides of said enclosure to tilt said fish inwardly towards the interior of said enclosure whereby said fish gradually slide towards said interior as they are propelled upwardly.

3. Fish handling apparatus as set forth in claim 1 wherein a retainer is formed on the upper portion of said enclosure to engage said boat during a fish transferring operation.

4. Fish handling apparatus as set forth in claim 1 wherein said enclosure includes a pair of side frame elements provided with a cover, the upper portion of said cover being open to define said aperture and said cover being formed with a retainer lip at the lower edge of said aperture to engage said boat during a fish transferring operation.

5. Fish handling apparatus as set forth in claim 1 wherein the upper and lower reaches of said enclosure are upwardly curved.

6. Fish handling apparatus as set forth in claim 1 wherein said chain means ride upon chain rails that are movable relative to said enclosure to thereby adjust the tension of such chains.

7. Fish handling apparatus as set forth in claim 1 wherein the upper portion of said enclosure is formed with a lateral offset in which is located said fish-discharge aperture, said lateral offset extending inboard relative to said boat.

8. Fish handling apparatus as set forth in claim 1 wherein said support means includes arm means pivotally connected at one end to said enclosure and at the opposite end to said boat, with said arm means supporting said enclosure for movement between an operative position alongside said boat and a stowed position on said boat.

9. Fish handling apparatus as set forth in claim 8 wherein said support means further includes a power cylinder and plunger interposed between said arm means and said boat to raise and lower said arm means and thereby urge said enclosure between an operative position alongside said boat and a stowed position on said boat.

10. Fish handling apparatus for moving fish upwardly, said apparatus comprising:
an open-sided enclosure that defines a loop, the upper portion of said enclosure being open to define a fish-discharge aperture and with the fish entering the lower portion of said enclosure through the open sides of said enclosure;
guide means disposed on the inner surfaces of said enclosure outwardly of the open sides thereof;
chain means looped about the interior of said enclosure and supported within said guide means;
a plurality of fish-moving baskets attached to said chain means at spaced points therealong; and
power-operated means on said enclosure that drives said chain means to thereby cause the baskets to continuously propel fish entering said enclosure through the open, lower sides of said enclosure upwardly along the interior of the enclosure and out of the enclosure through said fish-discharge aperture.

11. Fish handling apparatus as set forth in claim 10 wherein said chain means ride upon chain rails that are movable relative to said enclosure to thereby adjust the tension of such chains.

12. Fish handling apparatus as set forth in claim 10 wherein the upper portion of said enclosure is formed with a lateral offset in which is located said fish-discharge aperture.

13. Fish handling apparatus as set forth in claim 11 wherein the upper portion of said enclosure is formed with a lateral offset in which is located said fish-discharge aperture.

* * * * *